(12) United States Patent
Singer

(10) Patent No.: US 7,174,638 B2
(45) Date of Patent: Feb. 13, 2007

(54) CIRCULAR SAW DEVICE FOR CUTTING OFF TUBES

(75) Inventor: Stefan Singer, Gottmadingen (DE)

(73) Assignee: Illinois Tool Works Inc., Glenview, IL (US)

(*) Notice: Subject to any disclaimer, the term of this patent is extended or adjusted under 35 U.S.C. 154(b) by 108 days.

(21) Appl. No.: 10/969,347

(22) Filed: Oct. 19, 2004

(65) Prior Publication Data
US 2005/0097752 A1 May 12, 2005

(30) Foreign Application Priority Data
Nov. 10, 2003 (DE) ................................ 103 52 890

(51) Int. Cl.
*B23D 21/08* (2006.01)
*B26D 3/16* (2006.01)
(52) U.S. Cl. ............................................ 30/97; 82/113
(58) Field of Classification Search .................... 30/97, 30/94–96, 98–102; 82/113
See application file for complete search history.

(56) References Cited

U.S. PATENT DOCUMENTS

| | | | |
|---|---|---|---|
| 1,849,381 A | 3/1932 | Pealer | |
| 3,088,352 A * | 5/1963 | Tanner | 82/59 |
| 3,974,562 A | 8/1976 | Wüchner | |
| 4,511,826 A | 4/1985 | Kouchi et al. | |
| 4,625,464 A | 12/1986 | Kubo | |
| 4,953,292 A | 9/1990 | Tobey | |
| 5,243,760 A * | 9/1993 | May, Jr. | 30/101 |
| 5,349,751 A | 9/1994 | Fahr | |
| 5,933,963 A * | 8/1999 | Pierce | 30/97 |
| 6,129,488 A * | 10/2000 | Fahr | 407/31 |
| 6,257,110 B1 | 7/2001 | Ricci et al. | |
| 2001/0023540 A1 | 9/2001 | Kramer | |

* cited by examiner

*Primary Examiner*—Charles Goodman
(74) *Attorney, Agent, or Firm*—Bachman & LaPointe, P.C.

(57) ABSTRACT

A tube-cutting circular saw device, comprising a housing, a tube-clamping device for clamping the tube in relation to the housing, a motor-driven cutoff tool pivotable about the tube axis and a tool-guide device for the radial guidance of the cutoff tool around the clamped tube, the tool-guide device comprising a rotation body rotatable about the tube axis and a swivel plate pivotable about a swivel axis and connected to the rotation body, wherein the swivel plate contains a slide for the radial positioning of the cutoff tool.

9 Claims, 6 Drawing Sheets

CIRCULAR SAW DEVICE FOR CUTTING OFF TUBES

BACKGROUND OF THE INVENTION

The invention relates to a tube-cutting circular saw device, comprising a housing, a tube-clamping device for clamping the tube in relation to the housing, a motor-driven cutoff tool pivotable about the tube axis and a tool-guide device for the radial guidance of the cutoff tool around the clamped tube, the tool-guide device essentially comprising a rotation body rotatable about the tube axis and a swivel plate pivotable about a bolt and connected to the rotation body.

In tubing construction, above all when the medium must be conveyed under high pressure or at high temperature, metal tubings are often used. High-alloy thin-walled steel tubes, which are used, for example, in the pharmaceuticals industry, are easily damaged and deformed when they are clamped. These tubes therefore require careful and precise handling during the sawing operation and in subsequent machining. The cutoff device should also be adjustable to different tube diameters as precisely and rapidly as possible and without damage to the tube surface.

A tube-cutting circular saw device of the generic type is known from DE 2503426 C3. The cutoff tool can be swiveled from a rest setting into a cutting setting. The adjustment to different tube diameters is performed with a setting screw, which reaches through an eccentrically running groove in an eccentric disk and serves as a stop for the tool carrier. The adjustment to different tube diameters also incorporates the cutting depth. Prior to the next cutting operation, the tool carrier, with the drive motor for the cutoff wheel, must be swiveled back via the groove into the home position.

Based on this prior art, the object of the invention is to define a tube-cutting circular saw device, which is as simple as possible to operate and can be adjusted to different tube diameters as easily as possible and without play.

SUMMARY OF THE INVENTION

The foregoing object is achieved by a tube-cutting circular saw device, comprising a housing, a tube-clamping device for clamping the tube in relation to the housing, a motor-driven cutoff tool pivotable about the tube axis and a tool-guide device for the radial guidance of the cutoff tool around the clamped tube, the tool-guide device essentially comprising a rotation body rotatable about the tube axis and a swivel plate pivotable about a swivel axis and connected to the rotation body, wherein the swivel plate contains a slide for the radial positioning of the cutoff tool.

It is advantageous that the user can adjust the cutoff tool to the respective tube diameter with a simple adjusting operation and that, with a single continuous motion, he can guide the cutoff tool through the wall thickness of the tube and around the tube periphery and cut through the tube. This is achieved by the configuration of a contour in the tool-guide device and a cam, fitting the contour, on the swivel plate.

It is also advantageous that the user, with a simple motion, can release the slide for the adjustment of the tube dimension and is able to adjust the tube dimension. This is achieved by virtue of the fact that the turning handle is arranged in relation to the swivel plate such that it is axially displaceable and counter to the force of a spring integrated in the turning handle.

BRIEF DESCRIPTION OF THE DRAWINGS

An illustrative embodiment of the invention is described with reference to the Figures, in which.

DETAILED DESCRIPTION

Figure 1:
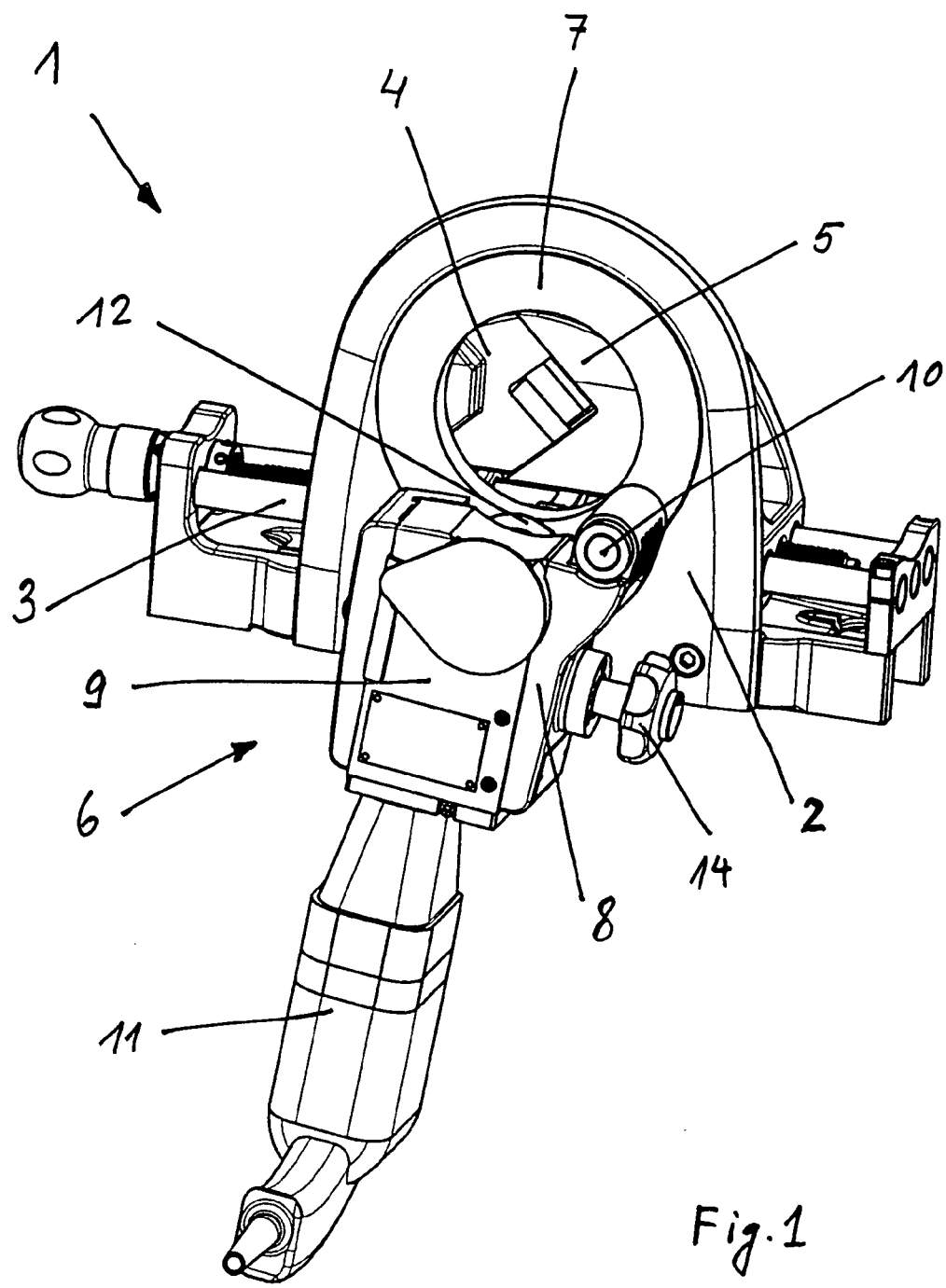
FIG. 1 shows a perspective view of a tube-cutting circular saw device according to the invention.

In FIG. 1, a tube-cutting circular saw device 1 is represented in perspective view seen from the aspect of the user. The circular saw device 1 can be fastened to a work bench or on a stand (neither of which are represented here). The circular saw device 1 essentially comprises a housing 2, to which a tube-clamping device 3 is fastened. The tube-clamping device 3 is represented here as a parallel vise 3 having clamping jaws 4, 5. With the clamping jaws 4, 5 of the tube-clamping device 3, the tube to be worked can be secured coaxially with the main axis of the circular saw device 1. The housing 2 contains a tool-guide device 6.

The tool-guide device 6 essentially comprises an annular rotation body 7, a swivel plate 8 and a slide 9. The annular rotation body 7 is rotatably mounted in the housing 2. On the rotation body 7 there is configured a swivel axis 10. The swivel plate 8 is mounted rotatably about the swivel axis 10 in relation to the rotation body 7. The slide 9 is arranged displaceably in relation to the swivel plate 8.

The slide 9 is thus pivotable and displaceable in relation to the main axis of the housing 2 and the tube axis. A drive motor 11, here an electric drive unit similar to a drill, and a cutoff tool 12, here a circular saw blade driven by the motor 11, form a unit with the slide 9. As a result of the motions of slide 9, swivel plate 8 and rotation body 7, the cutoff tool 12 can assume, in relation to the tube to be worked, any position necessary for the cutoff process. The steps of the cutoff process are essentially the clamping of the tube, the adjustment of the cutoff tool 12 to the respective tube diameter, the plunging of the cutoff tool 12 through the wall thickness of the tube and the cutting off of the tube by an orbital motion of the cutoff tool 12 around the tube. The cutoff tool 12, here a circular saw blade with a relatively small diameter, can be adjusted to the respective tube diameter by the displacement of the slide 9 in relation to the swivel plate 8, and can be guided radially around the tube axis by the motion of the rotation body 7.

Figure 2:
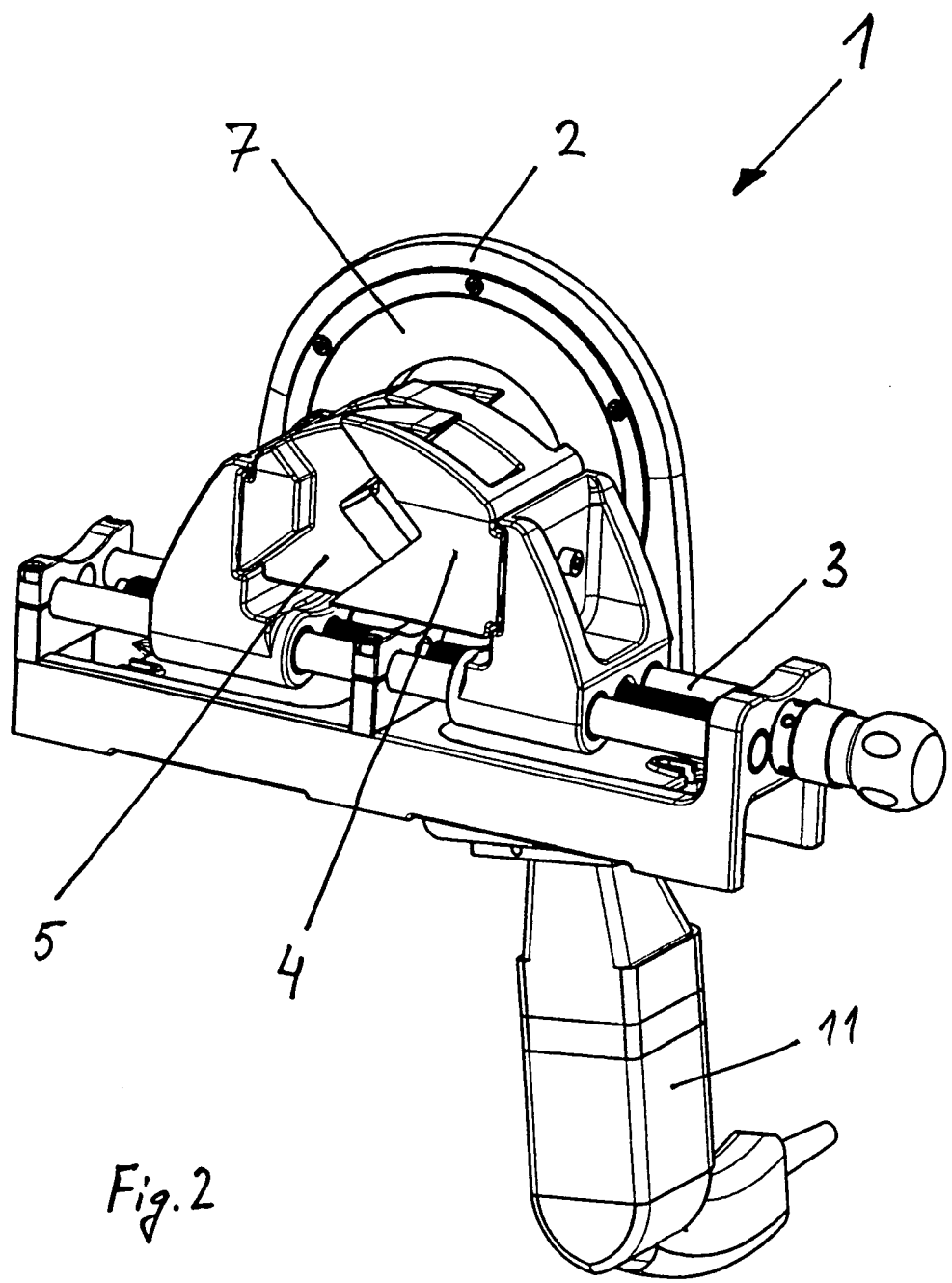
FIG. 2 shows a further perspective view of the circular saw device of FIG. 1.

In FIG. 2, the same circular saw device 1 is represented in perspective view from the opposite side. In FIG. 2, the tube-clamping device 3 with the clamping jaws 4, 5 can be seen particularly clearly. The electric motor 11, the housing 2 and the rotation body 7 are also visible. The clamping jaws 4, 5 respectively have an angle of opening of less than 90°, for example 85°. This has the effect that even thin-walled tubes can be clamped with the least possible deformation and without damage to the tube surface.

Figure 3:
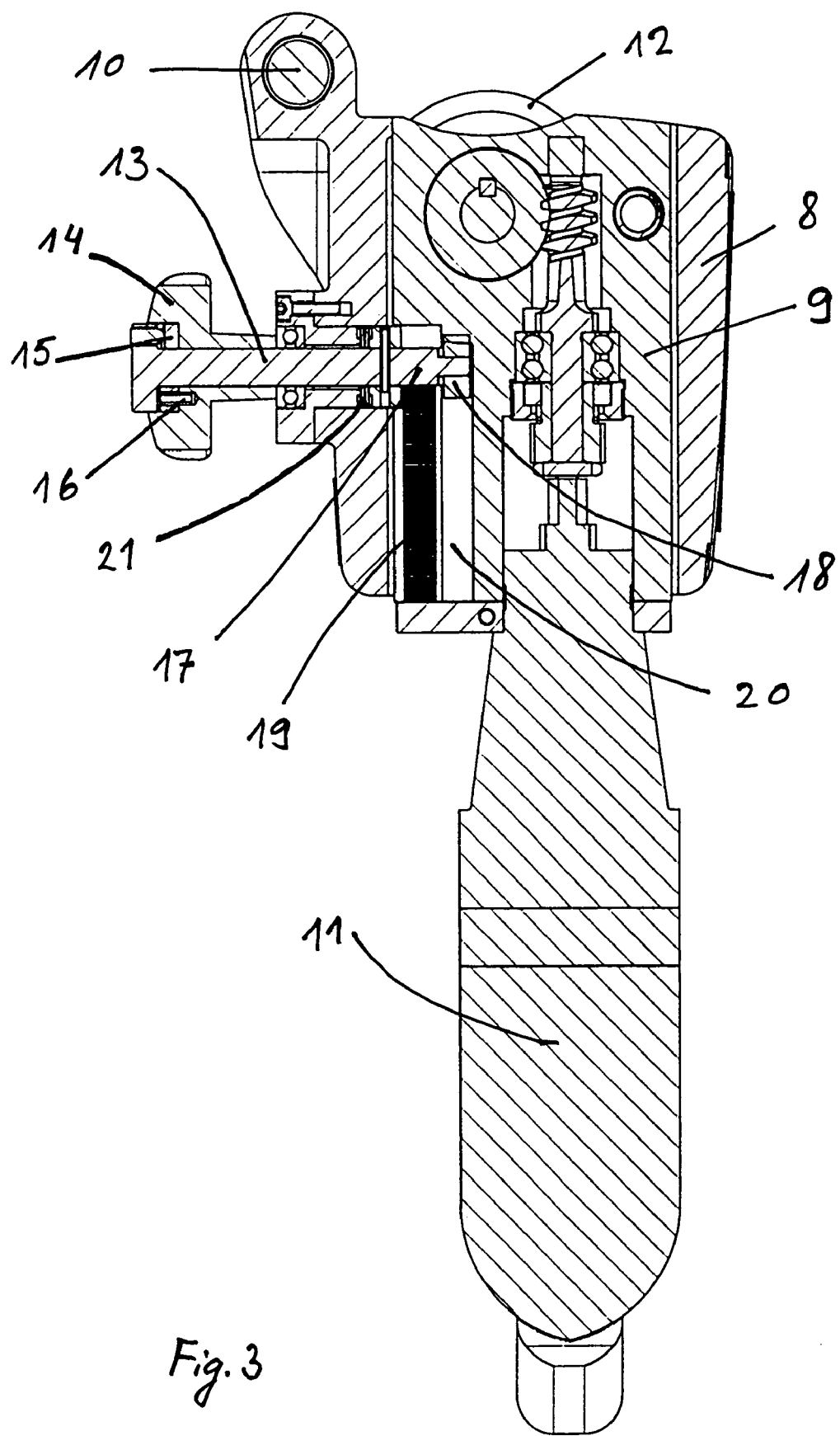
FIG. 3 shows a section through a part-region of the circular saw device of FIG. 1.

In FIG. 3, a part-region of the tool-guide device 6 is shown in sectional representation. The cut face runs perpendicular to the main axis of the circular saw device 1 and perpendicular to the axis of the tube to be worked. In the section of FIG. 3, it can be seen how the slide 9 is arranged displaceably in relation to the swivel plate 8. Running through the swivel plate 8 is a shaft 13. At its first end, the shaft 13 is connected in a couplable manner to a turning handle 14. In a recess in the turning handle 14 there is disposed, concentrically about the shaft 13, a cam ring 15. The eccentric disk 15 is fixedly connected to the turning handle 14 by means of a screw 16. The eccentric disk 15 has a thickness which increases with the angle of rotation of the eccentric 15 in the axial direction. Owing to the increasing thickness of the eccentric disk 15, the shaft 13 can be displaced in the axial direction, in relation to the swivel plate 8, by turning of the turning handle 14.

At the other end, the shaft has a toothing 17 and a conically configured locking piece 18. The toothing 17 is configured to fit a toothed rack 19 configured on the slide 9. In the section of FIG. 3, the toothing 17 is located at one end of the toothed rack 19. Through the displacement of the toothing 17 relative to the toothed rack 19, the slide 9 can be displaced relative to the swivel plate 8 within a large range, so that the circular saw device 1 can be adjusted to any chosen tube diameter. The conically configured locking piece 18 can be connected in locking arrangement to a thereto fitting locking surface 20 on the slide 9. Through the spring force of cup springs 21, which are disposed between the shaft 13 and the swivel plate 8, the locking piece 18 and thus also the swivel plate 8 are connected in locking arrangement to the slide 9.

By turning of the turning handle 14, the shaft 13 is displaced in the axially outward direction, counter to the spring force of the cup springs 21. The locking piece 18 detaches itself from the slide 9. As soon as the retaining force between slide 9 and locking piece 18 becomes less, the slide 9 with the toothed rack 19, which latter is moved by the toothing 17, is able to be displaced. The displacement of the slide 9 is used to adjust the cutoff tool 12 to the desired tube dimension. When the turning motion on the turning handle 14 is ended, the shaft 13 slips back automatically into a locking setting on the slide 9 as a result of the elastic force of the cup springs 21. The advantage for a user of the circular saw device 1 consists in the fact that, with a simple turning motion of the turning handle 14, he can both release the slide, adjust the cutoff tool 12 to the desired position and, without additional hand motions, relock the slide 9 in the new position.

This working method is above all faster compared to an adjusting mechanism using a spindle, since, with a spindle, owing to the desired precision, a small pitch and hence several revolutions have to be tolerated. The locking mechanism of a spindle also requires, in the adjustment, a second, additional hand motion. Through integration of the locking in the turning handle 14, operation has become significantly easier. The locking between slide 9 and swivel plate 8 is free from play, so that the cutting operation of the circular saw device 1 is able to be performed significantly more precisely than with previous appliances.

Figure 4:
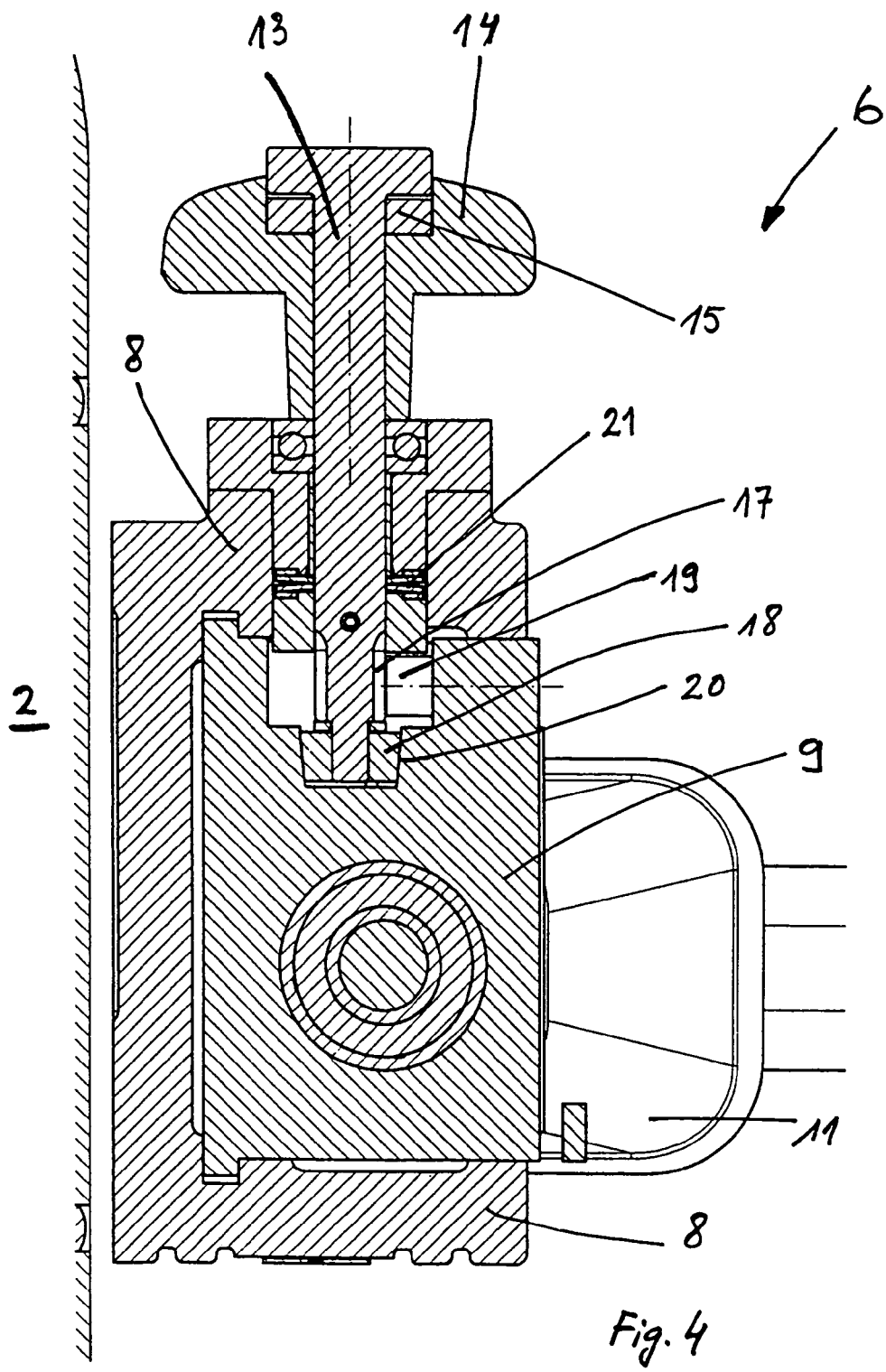
FIG. 4 shows a further section through the part-region of FIG. 3.

In FIG. 4, the same part-region of FIG. 3 is represented, once again in sectional representation. The cut face of FIG. 4 lies perpendicular to the cut face of FIG. 3. Clearly discernible are the cup springs 21, the toothing 17 on the shaft 13 and the thereto fitting toothed rack 19 on the slide 9, as well as the conically configured locking piece 18 at the end of the shaft 13.

Figure 5:
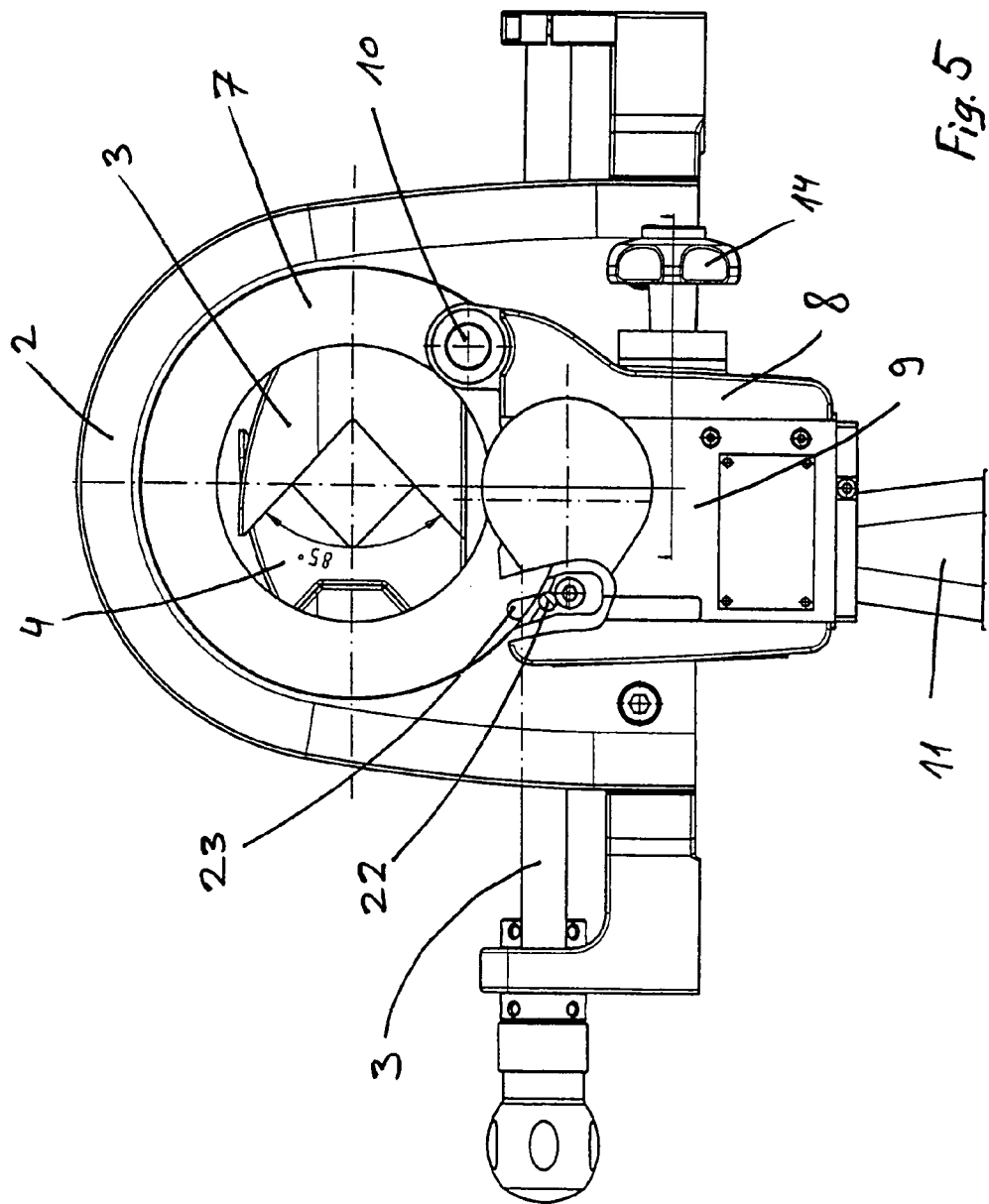
FIG. 5 shows a view of the circular saw device of FIG. 1 in rest setting and FIG. 6 shows a view of the circular saw device of FIG. 5 in work setting.
Figure 6:
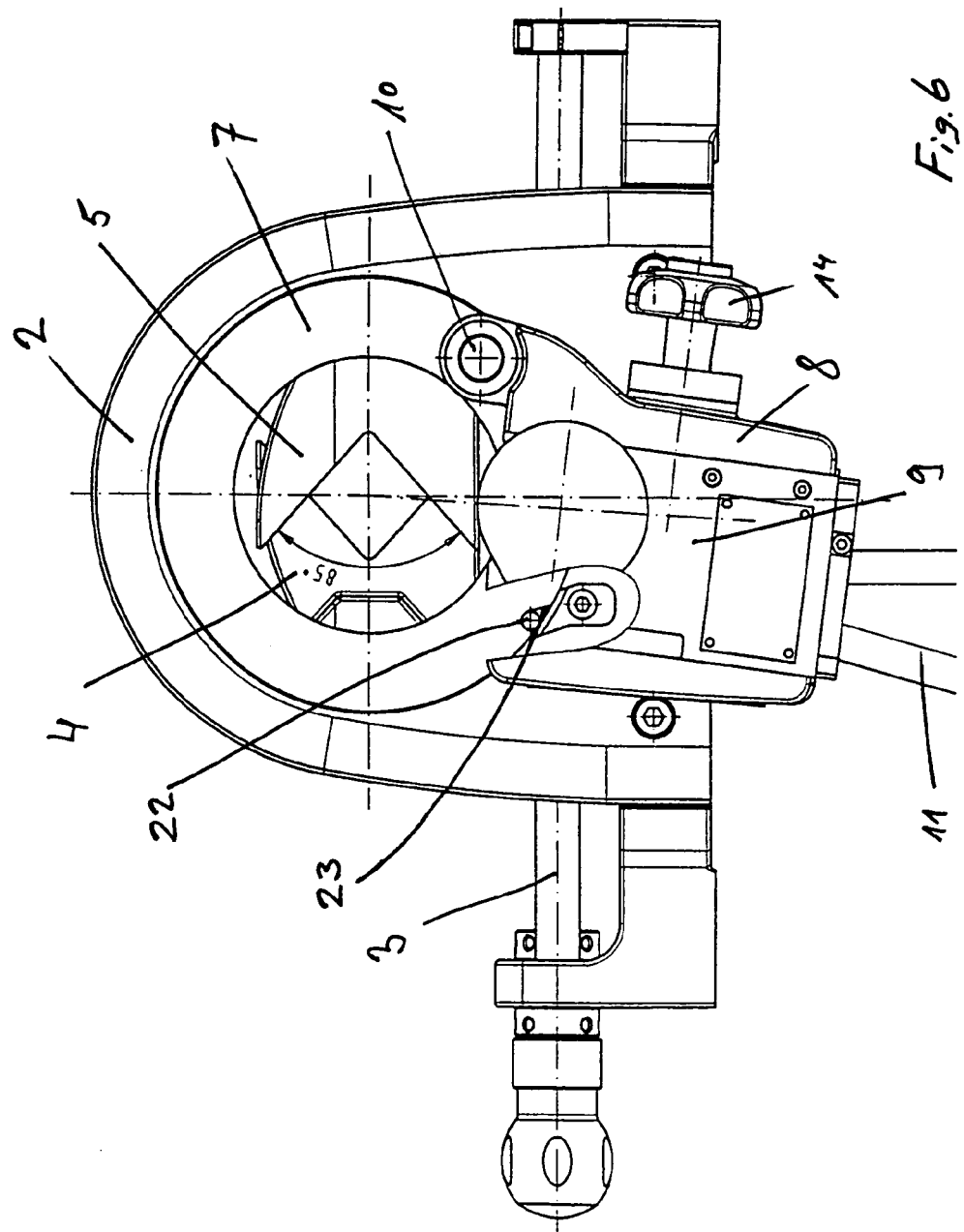

In FIGS. 5 and 6, the circular saw device 1 is represented once in the rest setting and once in the work setting. The cutoff tool 12 is guided in the clockwise direction around the tube to be worked. In FIG. 6 it can be seen how the slide 9 and the swivel plate 8 have been swiveled inward in the rotation body 7 prior to the turning motion of the cutoff tool 12 around the tube. Configured on the swivel plate 8 is a cam 22, which fits a groove with a contour 23 on the rotation body 7. As a result of the swivel plate 8 with the slide 9 and cutoff tool 12 having swiveled into the groove 23 in the rotation body 7, the circular saw device 1, prior to the actual cutting operation, is adjusted easily and precisely to the desired cutting depth, obtained from the external diameter and wall thickness of the tube. At the end of the cutting operation, following one revolution in the clockwise direction, the cam 22 can slide back easily out of the contour 23 and the circular saw device is ready to receive the next tube.

As a result of the displaceability of the cutoff tool 12 with the slide 9, which cutoff tool can be moved orbitally around the tube, the circular saw device 1 can be constructed from significantly fewer parts. A control cam with complex fixing mechanisms, which have to be released after each cutting operation and readjusted prior to the next cutting operation, is replaced by the arrangement of the contour 23 on the rotation body 7 and of the cam 22 on the swivel plate 8, which can likewise be produced with little effort. The cutoff tool 12 can be adjusted, in a simple and precisely reproducible manner for the consecutive process steps entailing adjustment of the tube dimension, plunging through the tube wall thickness and orbital cutting of the tube. The adjusting device with the spring-back turning handle 14 and the conical locking piece 18 can also be used for other tube-end-working machines.

The invention claimed is:

1. A tube-cutting circular saw device, comprising a housing, a tube-clamping device fastened to the housing for clamping a tube to be cut in relation to the housing, a motor-driven cutoff tool pivotable about a longitudinal tube axis and a tool-guide device for the radial guidance of the cutoff tool around the tube, the tool-guide device comprising an annular rotation body rotatably mounted in the housing and being rotatable about the tube axis and a swivel plate connected to the rotation body by means of a swivel axis and being mounted rotatably about the swivel axis in relation to the rotation body, wherein the swivel plate contains a slide arranged displaceably in relation to the swivel plate for the radial positioning of the cutoff tool, and wherein a contour is formed on the rotation body and a cam, fitting the contour, is formed on the swivel plate, such that the cam engages the contour by rotating the swivel plate about the swivel axis in one direction and such that the cam disengages the contour by rotating the swivel plate about the swivel axis in the opposite direction, the rotation body and the swivel plate together with the slide and with the cut-off tool are rotatable together as a unit in said one direction about the tube axis when the cam is in engagement with the contour.

2. The circular saw device as claimed in claim 1, wherein the slide is formed such that it is continuously displaceable and locks automatically in relation to the swivel plate.

3. The circular saw device as claimed in claim 1, wherein the swivel plate contains a turning handle, which cooperates with the slide disposed in the swivel plate such that the slide is automatically locked.

4. The circular saw device as claimed in claim 3, wherein within the turning handle there is disposed an axially displaceable shaft, which is coupled with the turning handle.

5. The circular saw device as claimed in claim 4, wherein between the turning handle and the shaft there is disposed a cam ring for converting the rotation motion of the turning handle into an axial displacement of the shaft.

6. The circular saw device as claimed in claim 4, wherein between the shaft and the swivel plate there is disposed a spring for the axial resetting of the shaft and of the turning handle in relation to the swivel plate.

7. The circular saw device as claimed in claim 4, wherein the shaft has a toothing, which is configured to cooperate with a toothed rack on the slide.

8. The circular saw device as claimed in claim 4, wherein on the shaft there is disposed a conically configured locking piece, which is configured to cooperate with a locking surface on the slide.

9. The circular saw device as claimed in claim 1, wherein the tube-clamping device has parallel-displaceable clamping jaws, the clamping jaws encompassing an angle of opening of less than 90°.

* * * * *